L. F. CAVANAUGH.
Attaching Brushes to Handles.
No. 8,200.
Patented July 1, 1851.
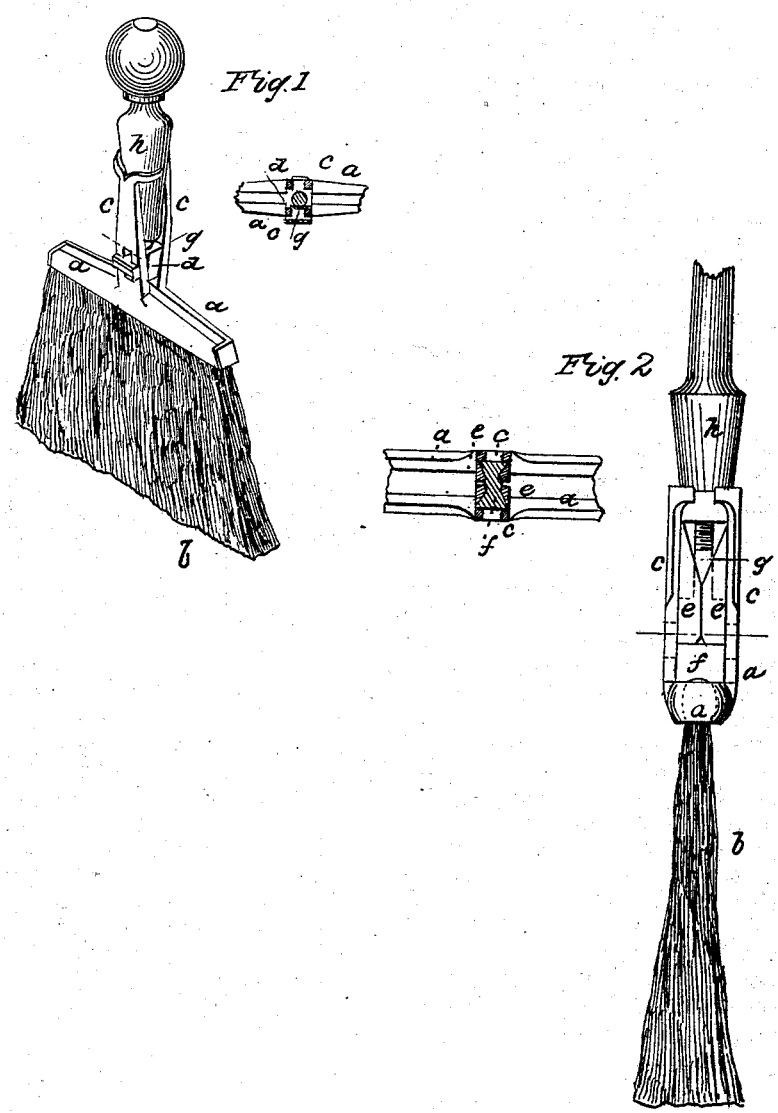

UNITED STATES PATENT OFFICE.

LUKE F. CAVANAUGH, OF NEWFIELD, NEW YORK.

IMPROVEMENT IN HANDLES OF BRUSHES AND BROOMS.

Specification forming part of Letters Patent No. 8,200, dated July 1, 1851.

*To all whom it may concern:*

Be it known that I, LUKE F. CAVANAUGH, of Newfield, in the county of Tompkins and State of New York, have invented certain Improvements in Connecting Brushes, &c., with their Handles; and I do hereby declare that the following is a full, clear, and exact description of the principle or character which distinguishes them from all other things before known, and of the usual manner of making, modifying, and using the same, reference being had to the accompanying drawings, of which—

Figure 1 is a side view and section of a brush, and Fig. 2 a view and section of one differently constructed.

My improvements consist in apparatus by which the bristles or the materials of which brooms, brushes, mops, &c., are constructed may be attached to their handles in such a manner that when worn out or disarranged they can be removed or replaced with little trouble by the user, thereby saving the expense of an entire new article.

The drawings show two modes of constructing the article, the principle being the same in each. It consists of two jaws $a\ a$, which hold the bristles $b$ between them. Each jaw has a piece $c$ projecting from it, forming a T, and they are connected together when made, as in Fig. 1, by a piece $d$, having two arms with oblong heads which are inserted through slots in the pieces $c$, and when turned to its proper position the heads hold the parts together. When constructed as in Fig. 2, projections $e$ are added to the inner side of the pieces $c$, having dovetailed cavities within them, into which the double dovetail $f$ fits and thus unites them, leaving sufficient play to allow the jaws to close on the bristles. The pieces $d$ or $f$ are on the heads of a screw $g$, onto which the handle $h$ is screwed, and the handle being made conical when screwed onto the screw $g$ the cone is forced between the extremities of the pieces $c$, spreading them apart and closing the jaws $a$ at the opposite extremity tightly on the bristles and holds them securely for use. When it is desired to change or renew the bristles, the handle is turned in the opposite direction, which releases the hold of the jaws.

Having thus described my improvements, what I claim as new therein is—

The lever-jaws held together by the head-piece of the screw $g$, in combination with the conical end of the handle, substantially in the manner and for the purpose set forth.

LUKE F. CAVANAUGH.

Witnesses:
EDWARD EVERETT,
WM. GREENOUGH.